US 8,511,073 B2

(12) United States Patent  
Kaiser (10) Patent No.: US 8,511,073 B2  
(45) Date of Patent: Aug. 20, 2013

(54) HIGH EFFICIENCY COGENERATION SYSTEM AND RELATED METHOD OF USE

(76) Inventor: Stewart Kaiser, Boca Raton, FL (US)

( * ) Notice: Subject to any disclaimer, the term of this patent is extended or adjusted under 35 U.S.C. 154(b) by 585 days.

(21) Appl. No.: 12/760,256

(22) Filed: Apr. 14, 2010

(65) Prior Publication Data

US 2011/0254269 A1 Oct. 20, 2011

(51) Int. Cl.
*F01K 15/00* (2006.01)
*F01N 3/00* (2006.01)

(52) U.S. Cl.
USPC .................................. 60/298; 60/297; 290/2

(58) Field of Classification Search
USPC .................. 290/2, 52; 123/2, 3; 60/298, 297
See application file for complete search history.

(56) References Cited

U.S. PATENT DOCUMENTS

| | | | |
|---|---|---|---|
| 3,665,495 A * | 5/1972 | Carter et al. | 307/67 |
| 4,226,214 A * | 10/1980 | Palazzetti | 123/2 |
| 4,503,337 A * | 3/1985 | H/a/ fner et al. | 290/4 D |
| 4,739,180 A * | 4/1988 | Yanoma et al. | 290/2 |
| 4,899,544 A | 2/1990 | Boyd | |
| 6,230,494 B1 | 5/2001 | Botti et al. | |
| 7,051,518 B2 * | 5/2006 | Benz et al. | 60/286 |
| 2002/0030363 A1 * | 3/2002 | Kennedy | 290/1 A |
| 2002/0030365 A1 * | 3/2002 | Underwood et al. | 290/40 B |
| 2003/0209909 A1 * | 11/2003 | Fukaya et al. | 290/40 A |
| 2004/0144338 A1 | 7/2004 | Goldman | |
| 2005/0172631 A1 | 8/2005 | Primlani | |
| 2005/0206167 A1 * | 9/2005 | Gehret, Jr. | 290/2 |
| 2005/0264014 A1 * | 12/2005 | Brandenburg et al. | 290/1 A |
| 2006/0076779 A1 * | 4/2006 | Craig et al. | 290/1 A |
| 2006/0113797 A1 * | 6/2006 | Satou et al. | 290/2 |
| 2006/0288720 A1 * | 12/2006 | Jmaev | 62/236 |
| 2007/0007771 A1 * | 1/2007 | Biddle et al. | 290/7 |
| 2007/0227470 A1 * | 10/2007 | Cole et al. | 123/3 |
| 2008/0023965 A1 * | 1/2008 | Cagliari et al. | 290/1 B |
| 2008/0236561 A1 * | 10/2008 | Kaiser | 126/116 |
| 2009/0044529 A1 * | 2/2009 | Su et al. | 60/516 |
| 2010/0101231 A1 * | 4/2010 | Westmeier | 60/783 |
| 2011/0042968 A1 * | 2/2011 | Tronstad | 290/1 R |

* cited by examiner

*Primary Examiner* — Julio Gonzalez Ramirez

(74) *Attorney, Agent, or Firm* — Allen, Dyer, Doppelt, Milbrath & Gilchrist, P.A.

(57) ABSTRACT

The invention is directed to a high efficiency cogeneration system capable of creating electricity and usable heat. The invention includes a fuel source, which can be a reservoir filled with a fossil fuel. The fuel source feeds a modified combustion engine that can turn a shaft to power an alternator to create electricity. The combustion engine creates hot gases that are treated by a catalytic converter. The byproduct and hot gases are then fed into one or more cooling manifolds.

8 Claims, 6 Drawing Sheets

HIGH EFFICIENCY COGENERATION SYSTEM AND RELATED METHOD OF USE

FIELD OF THE INVENTION

This invention is directed toward a cogeneration system that employs a catalytic converter and one or more cooling manifolds to increase efficiency in generating electricity as well as usable heat.

BACKGROUND OF THE INVENTION

Cogeneration represents a relatively new concept in the field of generating electricity. Traditionally, electricity has been created at centralized facilities—typically through burning a fossil fuel like coal—which is then transported through an electricity grid to individual residential and commercial facilities.

Within the past several years, cogeneration systems have been developed to essentially reduce both need and reliance on these grids. More specifically, cogeneration systems employ a heat engine (typically a combustion engine) or power station located at the residential or commercial facility itself to simultaneously generate both electricity and useful heat. Most cogeneration systems use a centralized reservoir of fossil fuel to create electricity, heat running water and air and often provide energy back into the grid for credit.

Recently, there have been several forms of cogeneration systems developed for use in residential homes and smaller commercial facilities. These systems have been dubbed "mini-cogeneration" systems—due to their modest size and performance. Another common name associated with these systems is a distributed energy resource ("DER") system.

Regardless of moniker, these systems produce usually less than 5 kWe. Instead of burning fuel to merely heat space or water, some of the energy is converted to electricity in addition to heat. This electricity can be used within the home or business or, if permitted by the grid management, sold back into the electric power grid. A recent study by the Claverton Energy Research Group found that such a co-generation system offered the most cost effective means of reducing $CO_2$ emissions—even compared to use of photovoltaics.

Apart from the energy conversation associated with mini-cogeneration systems, the technology also offers additional logistical benefits. Such cogeneration systems often offer more reliable energy solutions to residential dwellings in rural areas in which it is difficult to gain access to the grid. Alternatively, these systems offer more stable energy supplies in areas often affected by natural disasters such as hurricanes, tornadoes and earthquakes—where the downing of power lines will often lead to large periods with a lack of energy.

While there exist multiple benefits for micro-cogeneration systems, they currently possess several drawbacks. First, current cogeneration systems still create a certain degree of byproduct from the burning of fossil fuels that must be released into the atmosphere. This creates a secondary safety issue as there is a risk that unless this toxic byproduct is sufficiently vented that it could cause a build up of carbon monoxide within the residence. Second, most of the heat engines used in micro-cogeneration systems are not highly efficient resulting in waste of expensive fossil fuels. Finally, many co-generation systems fail to adequately harvest all of the heat by-product created from the heat engines—which could be used to heat air and water used throughout the residence.

Accordingly, there is a need in the field of micro-cogeneration systems for a highly efficient system that creates more electricity resulting in less venting of by-product. Moreover, such system should ensure greater capture of usable heat for purpose of warming air and/or water for use in the home. Finally, such improved system should preferably be compact, self-contained and easy to use.

SUMMARY OF THE INVENTION

The invention disclosed herein teaches a high efficiency cogeneration system capable of generating electricity and usable heat for use in either a residential or commercial facility. The cogeneration includes a fuel source, which may be either a reservoir or pipeline capable of supplying an energy source—which can be, but is not limited to, a fossil fuel (such as propane, natural gas, or fuel oil). Connected to the fuel source is a modified combustion engine, which includes a plurality of pistons that turn a shaft to power an alternator to create electricity. Based upon combustion of the energy source, the modified combustion engine generates hot gases that are fed into a catalytic converter that may contain a quantity of platinum and palladium.

The catalytic converter treats the gases formed from combustion and separates this effluent into both undesirable hot gases (such as carbon monoxide) and treated byproduct. The invention next contemplates separating these hot gases and treated byproduct through one or more cooling manifolds. Preferably, these cooling manifolds include a plurality of heat exchangers that are supplied with cooling water through a water supply line.

Each heat exchanger includes an inlet connected to the water supply line and an outlet that feeds into a subsequent heat exchanger. Moreover, each heat exchanger is comprised of a first conduit, a second conduit, and a third conduit. Here, the first conduit is filled with cooling water, and encapsulates the second conduit filled with both hot gases and treated byproduct. Liquefied treated byproduct is then transported into a third conduit (also encapsulated by the second conduit), transitioned via an elbow and horizontal passage to a collection basin. The collection basin connects to a liquid separator that includes a partial vacuum to separate any light gases for recycle and re-treatment in the catalytic converter. Hot gases maintained within the second conduit likewise can recycle back to the catalytic converter upon treatment by the cooling manifold.

The invention is also directed at a control system that includes a control panel, a battery, an automatic transfer switch and a crediting meter that connects to the outside electricity grid. The control panel may include both a regulator and filter which helps harmonize the electricity generated by the modified combustion engine for use by both the residential or commercial facility and the outside electricity grid. The battery connects to the control panel and stores electricity generated by the cogeneration system. This battery further includes (and is connected to) an automatic transfer switch capable of drawing electricity as needed by a breaker panel. The breaker panel helps fuel and supply energy to the various appliances throughout a residential or commercial facility. Finally, the crediting meter records the amount of electricity sold back to the power authority operating the electricity grid.

BRIEF DESCRIPTION OF THE DRAWINGS

For a fuller understanding of the invention, reference is made to the following detailed description, taken in connection with the accompanying drawings illustrating various embodiments of the present invention, in which.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Positioning and Location of System

Figure 1:
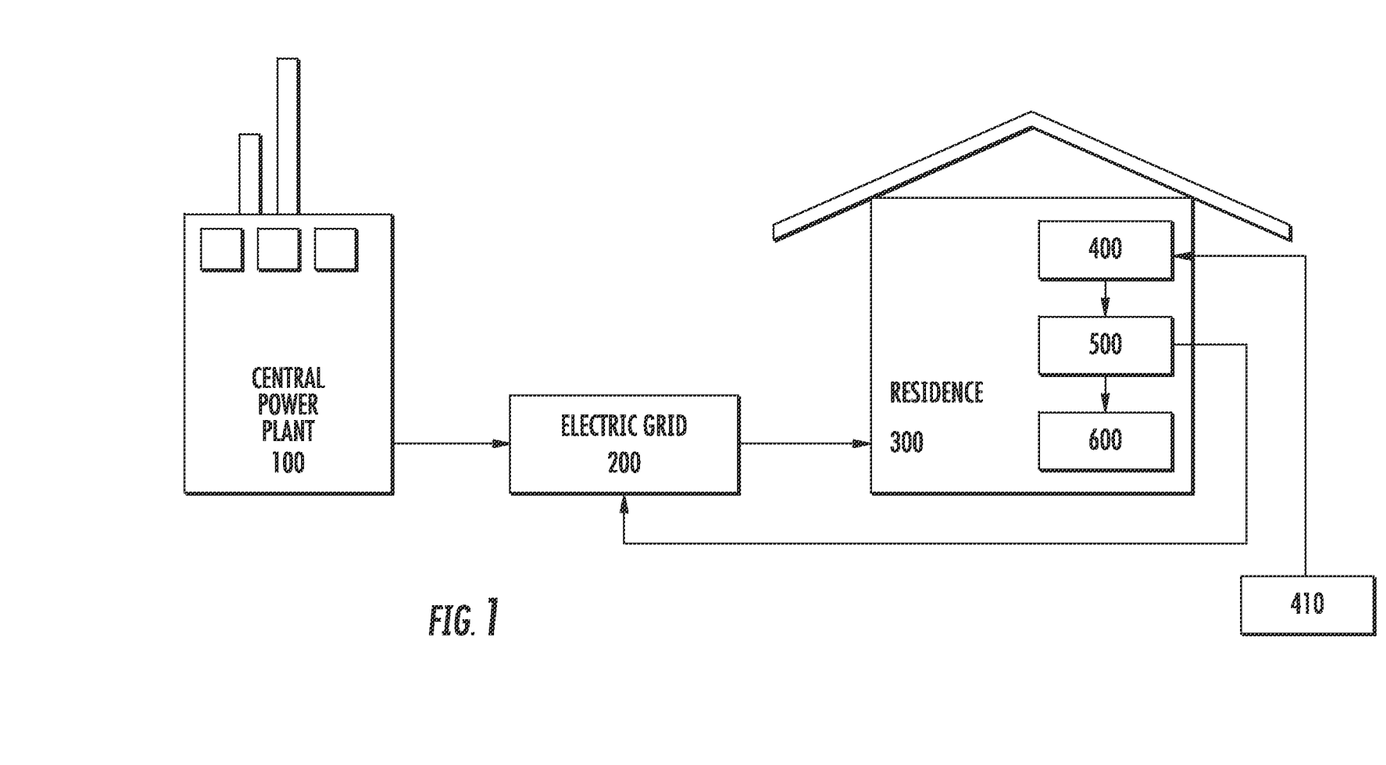
FIG. 1 is a schematic illustrating the overall positioning of the cogeneration system in light the electricity grid.
Figure 2:
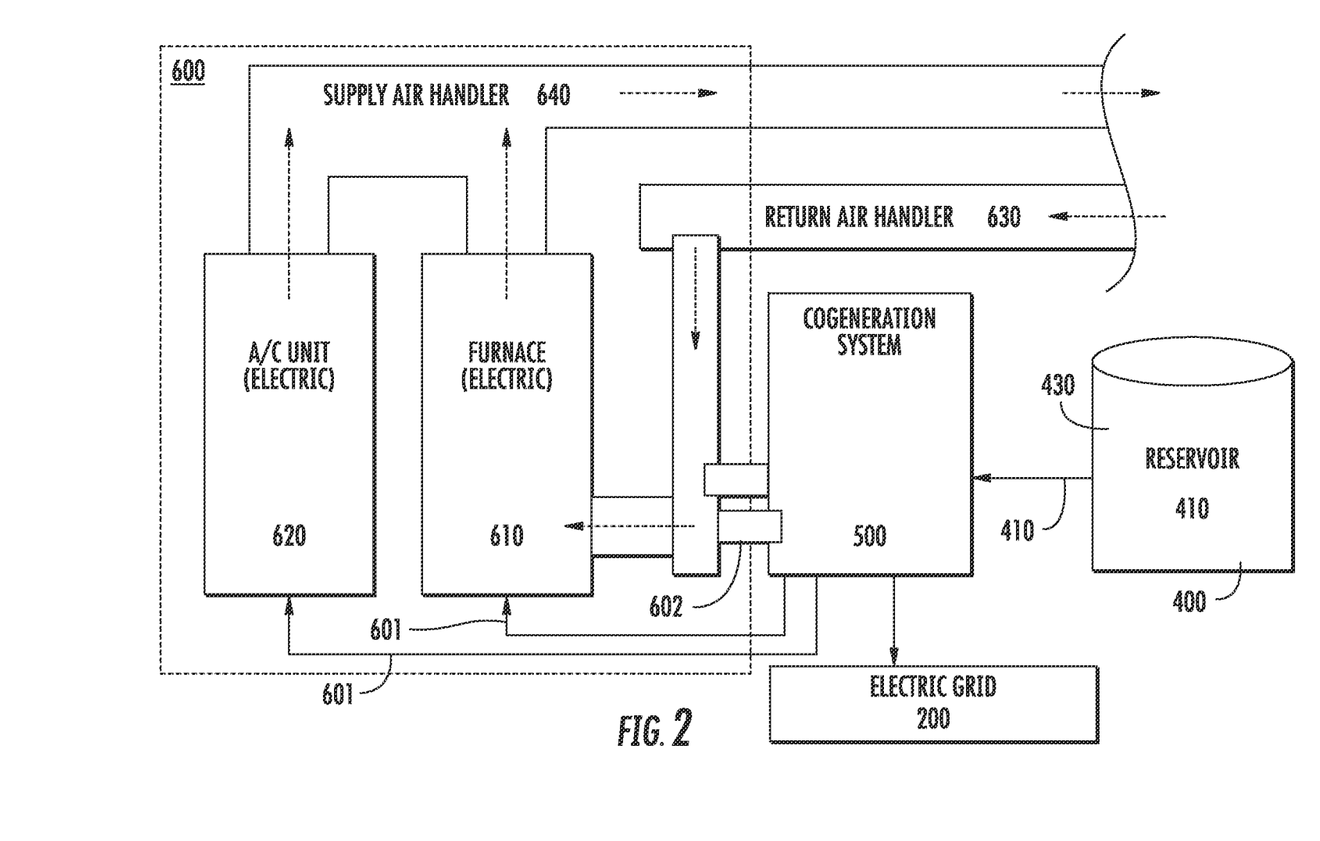
FIG. 2 is a diagram illustrating placement of the cogeneration system and various connections with the existing furnace, air-conditioning and air handlers.

FIG. 1 and FIG. 2 both illustrate, by way of example, one positioning and location of the preferred cogeneration system 500. FIG. 1 provides a general illustration of a conventional centralized power generation system. Here, a central power plant 100 generates electricity for disbursement to a plurality of various residential and commercial facilities 300 throughout a distinct geographic area. Such central power plant 100 can create electricity through an energy source 430 such as conventional burning of fossil fuels (typically coal), through nuclear energy or harnessing geothermal energy.

Positioned between the central power plant 100 and the residential or commercial facility 300 is the electric grid 200. This electric grid 200 consists of various transformers, power stations and power lines that transport electric from the central power plant 100. This electricity is then supplied to residential or commercial facilities 300 for use.

When a residential or commercial facility employs the invention, they must also include various components to properly service the overall apparatus. This includes a fuel source 400 that supplies a sufficient amount and quantity of energy to the cogeneration system 500. Such fuel source 400 may include, but is certainly not limited to, a reservoir 410 of fossil fuels such as petroleum, crude oil, liquid natural gas (LNG), propane, or fuel oil. Alternatively, the fuel source 400 may alternatively be a fuel line 420 such as a natural gas or propane line supplied by a municipality. Regardless, either fuel source 400 must supply sufficient energy to power the cogeneration system 500—which in turn can create electricity and usable heat for the furnace 600 and other appliances.

FIG. 1 also illustrates how the cogeneration system 500 can supply energy back to the electric grid 200 for credits. This occurs when the cogeneration system 500 supplies a greater level of energy than required by the residential facility 300.

While FIG. 1 shows the placement of the cogeneration system in light of the electric grid 200, FIG. 2 shows interconnectivity within the residential facility 300 itself. As illustrated, an energy source 430 stored within a reservoir 410 is supplied to the cogeneration system 500. Spending of this energy source 430 within the cogeneration system 500 creates two forms of energy: electricity 601 and usable heat 602. The electricity 601 can provide energy to the residential facility 300, as well as power both the furnace 610 and the air-conditioning unit 620. Alternatively, the furnace 610 can be supplied energy directly from the reservoir 410.

In addition, usable heat 602 created by the cogeneration system 500 can be used to heat air from a return air handler 630 prior to being introduced into the furnace 610 for heating. By doing so, the system essentially pre-heats the incoming cooler air prior to being warmed by the furnace 610, which in turn requires less energy (and results in less strain on the furnace 610). This is one of many forms of energy conservation contemplated by the invention.

Once heated air leaves the furnace 610 it is positioned within a supply air handler 640 to be circulated throughout the residential facility 300. Alternatively, when cooler air is desired, the convention contemplates having the air conditioning unit 620 supply cooler air to the supply air handler 640. As such the apparatus taught by the invention requires interplay and interconnectivity between the cogeneration system 500, the furnace 610, air conditioning unit 620 and both air handlers 630 and 640 to ensure efficient cooling and heating of air circulated throughout the home.

The Cogeneration System

Figure 3:
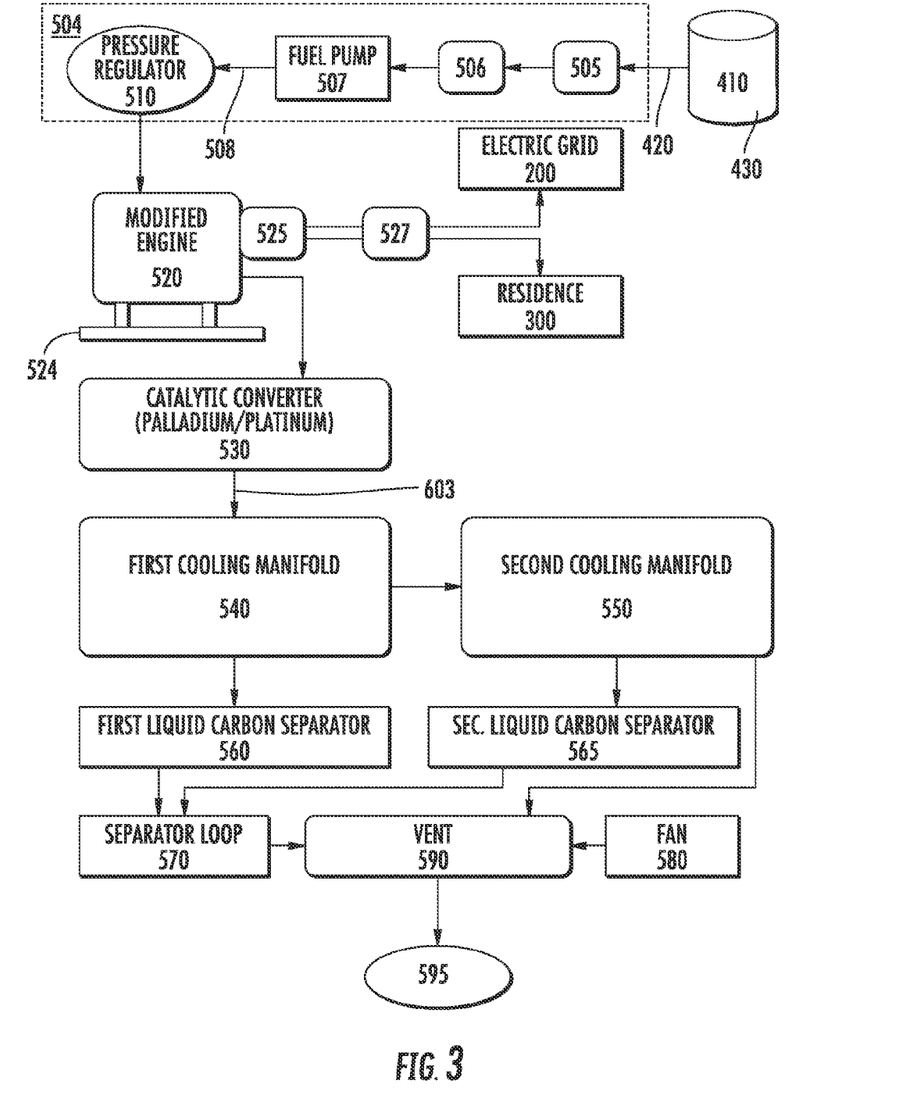
FIG. 3 illustrates the primary components of the cogeneration system including the catalytic converter and cooling manifolds.

FIG. 3 illustrates, by way of example, the components that make up the cogeneration system 500. As shown, the primary components of the apparatus include a reservoir 410 capable of housing an energy source 430 (which can be a fossil fuel), a regulator system 504, a modified engine 520, a catalytic converter 530, and two cooling manifolds 540 and 550 which help treat the various hot gasses 603 which form as byproduct from the modified engine 520. Other additional or substitute components will be recognized and understood by those of ordinary skill in the art after having the benefit of the foregoing disclosure.

As illustrates in FIGS. 2 and 3, the first component of the cogeneration system 500 is the fuel source 400, which can be a reservoir 410. The reservoir 410 is of a size and dimension to provide a sufficient amount and quantity of an energy source 430 to fuel the cogeneration system 500 for a defined period of time—preferably thirty days. Moreover, the reservoir 410 is designed to maintain a variety of fossil fuels including petroleum, natural gas, propane, methane, fuel oil or any similar and related fuel known and used to create energy via combustion. The reservoir 410 is typically housed outside of the residential facility 300 for safety and aesthetics.

Regardless of the type, the energy source 430 is drawn out of the reservoir 410 and treated for injection into the modified engine 540 through a regulator system 504. This regulator system 504 ensures that the energy source 430 is fed to the modified engine 540 at a specific pressure and flow rate— regardless of the outside temperature, pressure or weather conditions. Because the cogeneration system 500 will be employed in a variety of conditions from low lying areas to the mountains, in tropical climates to artic regions—the regulator system 504 must be self-regulating, robust and capable of handling large swings in weather conditions.

As illustrated in FIG. 3, the regulator system 504 includes four primary components: two fuel valves 505 and 506, a fuel pump 507 and a pressure regulator 510. Other related and additional components will be recognized and understood by those of ordinary skill in the art upon review of the foregoing.

The energy source 430 is drawn from the reservoir through the fuel pump 507 for transport into the modified engine 520.

Positioned between the reservoir 410 and fuel pump 507 are a plurality of fuel valves 505 and 506. More specifically, there is a first fuel valve 505 and second fuel valve 506—which function to help regulate the flow and velocity of the energy source 430. The underlying purpose of both fuel valves 505 and 506 is to ensure redundancy in case one valve malfunctions, becomes clogged or becomes inoperable.

A pressure regulator 510 is positioned after the fuel pump 507 to ensure the proper pressure of the energy source 430 prior to entry into the modified engine 520. The energy source 430 travels throughout both fuel valves 505 and 506, the fuel pump 507 and the pressure regulator 510 through a sixteen gauge shell, two inch fire rated insulation acoustic lined conduit 508 which includes a sixteen gauge interior body with powder coating.

Once the pressure of the power source 430 stabilizes through use of the pressure regulator 510, the fuel then enters the modified engine 520. As illustrated with reference to FIG. 6, the modified engine 520 can act as a regular combustion engine to burn the power source 430, which in turn drives one or more pistons 521 to turn a shaft 522 that rotates an alternator 523 to create electricity.

Figure 6:
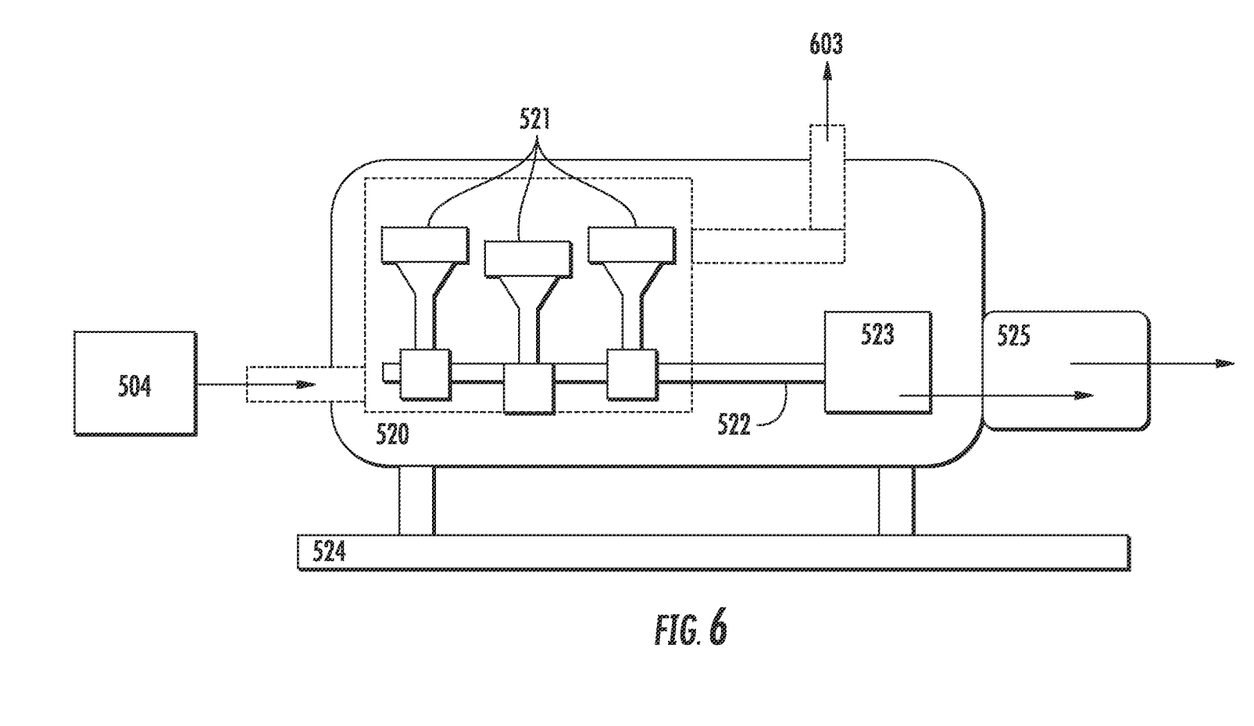
FIG. 6 illustrates the components of the modified combustion engine.

With reference to FIG. 6, byproducts of the modified engine 520 include usable heat 602, as well as hot gasses 603. These hot gasses 603 include, but are not necessarily limited to, HC, CO, $CO_2$, $NO_x$, $SO_x$ and trace particulates (C9PM0). When leaving the modified engine 520, these hot gasses 603 have a pressure between 80 to 100 psi and a temperature between 800 to 1200 degrees Fahrenheit. These high pressure and temperature hot gasses 603 are then transported into the catalytic converter 530 for treatment.

The modified engine 520 illustrated in both FIG. 3 and FIG. 6 ensures delivery of usable electricity to not only the residential facility 300 but also the electric grid 200. As shown in FIG. 3, this is achieved through combination of a vibration mount 524 and a harmonic distort alternator 525—both of which are attached to the modified engine 520. The vibration mount 524 is positioned below the modified engine 520 through a plurality of stabilizing legs.

The function and purpose of the vibration mount 524 is to ensure that the modified engine 520 is not only secure but does not create a distinct frequency—through the turning of the various pistons 521, shaft 522, and alternator 523 (shown in greater detail in FIG. 6)—to risk degrading the quality of usable electricity flowing from the cogeneration system 500. This is because the electric grid 200 requires a very specific and regulated electric supply.

The uniform feed of electricity to both the residential facility 300 and electricity grid 200 is further aided by the harmonic distort alternator 525. As shown in FIG. 3, the harmonic distort alternator 525 is positioned directly on the modified engine 520 and prior to both the residential facility 300 and electricity grid 200. This harmonic distort alternator 525 regulates the amplification and voltage of electricity. In addition, a subsequent electric filter 527 can be used to provide a final regulation of the electricity. A more detailed description of this system is offered in FIG. 6 described in greater detail below.

FIG. 3 also illustrates the placement, positioning and utility of the catalytic converter 530. The catalytic converter 530 functions to help ensure the proper treatment of the hot gasses 603 created by combustion within the modified engine 520—in order to reduce levels of toxic byproducts being released into the atmosphere.

Overall efficiency of the catalytic converter 530 is based upon two primary chemical properties: (a) selection of the correction platinum based catalytic material, and (b) regulating the proper temperature and pressure of the hot gases 603 when entering the catalytic converter 530. More specifically, the invention contemplates feeding the various hot gases 603 into the catalytic converter 530 at between 800 to 1000 degrees Fahrenheit, at a pressure ranging between 80 to 100 psi. The preferred catalytic material is a combination of palladium and platinum. Based upon the invention, the catalytic converter 530 is 99.99% efficient in converting the various hot gases 603 into non-toxic treated byproduct 604.

Hot gases 603 treated by the catalytic converter 530 are then transported into one or more cooling manifolds 540 and 550. As shown in both FIGS. 3 and 5, each cooling manifold 540 includes a series of heat exchangers tasked with cooling the various hot gases 603 to essentially ambient temperature. Within each manifold, cooling water 543 is supplied from an external water supply line 542 (usually the same as used by the residential facility 300) in a first conduit 543. This first conduit 544 encapsulates a second conduit 545 in which hot gases 603 flow through the manifold 540. Based upon the temperature gradient created between both conduits 544 and 545, the hot gases 603 are cooled while the cooling water 543 is warmed.

As shown in greater detail in FIG. 3, once the hot gases 603 are cooled, they leave the cooling manifold 530 and enter into a liquid separator 560. At this point, the hot gases 630 are at or near ambient temperature. Moreover, much of the hot gases 603 have been filtered for either removal into the atmosphere or recycled for re-treatment in the catalytic converter 520. What hot gases 603—which are mostly light by-products—are filtered by the liquid separator 560. The liquid separator 560 creates a sufficient vacuum within the remaining hot gases 603 to remove these light-weight byproducts 604 for eventual off-gassing.

As shown in FIG. 3, it is preferred that there be at least two cooling manifolds 540 and 550 to separate and bring the hot gases 403 to ambient temperature: a first cooling manifold 540 and second cooling manifold 550. As shown, the second cooling manifold 550 feeds into a second liquid separator 565—which functions the same as the first liquid separator 560. There are two contemplated designs for the invention, first the first cooling manifold 540 can feed into a second cooling manifold 550 to create an "in series" design. Alternatively, the both cooling manifolds 540 and 540 can work in parallel—such that they both receive hot gases 603 from the catalytic converter 530 to be cooled and separated by both liquid separators 560 and 565 also in parallel.

Materials drawn from both liquid separators 560 and 565 are then placed in a separator loop 570. This loop 570 functions to circulate the various cooled by-products 595 and allow off gassing through a vent 590. The vent 590 may be aided by a fan 580.

Control and Storage of Generated Electricity

Figure 4:
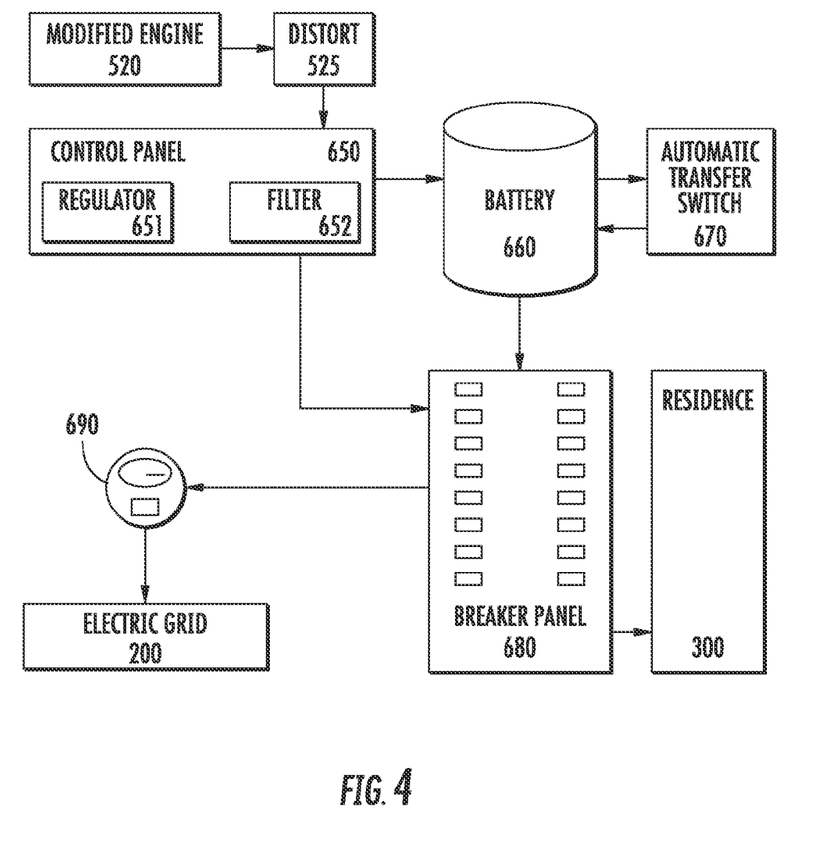
FIG. 4 is a schematic illustrating the various components of the control system, which includes a battery.

FIG. 4 illustrates, by way of example, one manner in which electricity created by the cogeneration system 500 is controlled, stored and sold back to the electricity grid 200. As shown and described in greater detail above, electricity is generated in the modified engine 520 through combustion of an energy source 430. This electricity is sent to the harmonic distort alternator 525 to ensure the current matches the consistency of electricity found in the electricity grid 200.

In the embodiment shown in FIG. 4, electricity leaves the distort alternator 525 and flows into the control panel 650.

The control panel 650 includes several components to filter and regulate the incoming electricity. First, the control panel 650 includes a regulator 651 that helps purify the current of the electricity coming from the modified engine 520. Second, the control panel 650 includes a filter 652 that normalizes any noise or distortion remaining within the current.

Filtered and regulated electricity can then be directed to two receptacles: either a battery 660 for later use or directly to the residential facility 300. As shown in FIG. 4, the cogeneration system 500 can include a battery 660 capable of storing electricity for later use by the residential facility 200. Attached to the battery is an automatic transfer switch 670. The switch 670 functions to gauge energy needs of the residential facility 300. If the home needs or anticipates greater energy use, the switch 670 ensures that electricity is drawn from the battery for use by the residential facility 200.

As further shown in FIG. 4, electricity can flow either from the control panel 650 or the battery 660 into the breaker panel 680 of the residential facility 300. The breaker panel 680 allows various appliances throughout the residential facility 300 to be supplied with electricity from the cogeneration system 500. Excess energy not needed by the breaker panel 680 to supply the energy needs of the residential facility 300 is then transported to the electricity grid 200. Prior to transport to the electricity grid 200 it is preferable that current flows through a meter 690 to measure the credits appropriate for the residential facility 300 to receive from the public utility.

The Cooling Manifolds

Figure 5:
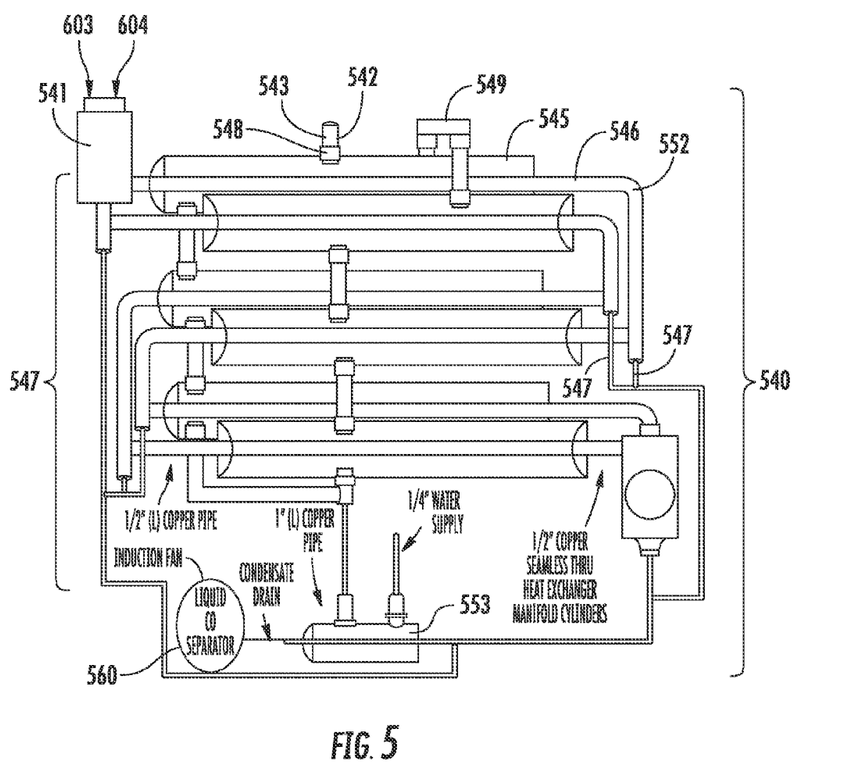
FIG. 5 is a schematic that illustrates the components of the first cooling manifold.

FIG. 5 illustrates, by way of example, the first cooling manifold 540. The preferred first cooling manifold 540 functions essentially as a heat exchanger to necessarily cool the various hot gases 603, generated from the modified engine 520, which have been treated by the catalytic converter 530. Based upon treatment the combination of platinum and palladium within the catalytic converter 530, resulting in 99.99% conversion of these various hot gases 603 into inert and safe treated byproduct 604. The remaining non-treated hot gases 603 and treated byproduct 604 are then separated and filtered through the first cooling manifold 540 (in combination with the first liquid separator 560) through a temperature gradient effectuated by interaction with cooling water.

As illustrated FIG. 5, the first cooling manifold 540 includes, but is not necessarily limited to a collection chamber 541, a water supply line 542, cooling water 543, a first conduit 544, a second conduit 545, a third conduit 546, a plurality of connecting elbows 552 and a condensate drain 553. While FIG. 5 denotes six portions of the first conduit 544 in parallel relation to one another, the invention contemplates up to twenty-one such portions to ensure effective treatment and separation of the various hot gasses 603 and treated byproduct 604. Moreover, while FIG. 5 shows the various parts and functionality of the first cooling manifold 540, it is understood that these are the same primary components also found in the second cooling manifold 550.

As further shown in FIG. 5, hot gases 603 and treated byproduct 604 flow from the catalytic converter 530 into the collection chamber 541 of the first cooling manifold 540. This collection chamber 541 allows both hot gases 603 and treated byproduct 604 to be positioned for cooling via the heat exchanger created within the first cooling manifold 543.

Positioned parallel to the collection chamber 541 is a heat exchanger 547 that consists of a plurality of conduits 544-546 in which the actual heat exchange takes place. The first conduit 544 is larger in both length and diameter in comparison to the second conduit 545 and the third conduit 546. Moreover, it is preferable that the first conduit 544 is of a sufficient size and dimension to encapsulate and fit over both the second conduit 545 and the third conduit 546.

The first conduit 544 includes a water intake 548 and a corresponding water discharge 549. Connected to the first conduit 544 through the water intake 548 is a water supply line 542. The water supply line 542 provides cooling water 543 to the first cooling manifold 540—typically form the municipal water supply available in the residential facility 300—which is at ambient temperature. Thus, this water supply line 542 helps fill the first conduit 544 with cooling water 543 to help in the heat exchange process.

Positioned within the first conduit 544 of the heat exchanger 547 is the second conduit 545. Both hot gases 603 and treated byproduct 604 enter the second conduit 545 through the chamber collection 541. Heat exchange occurs when the warmer second conduit 545 is cooled by the surrounding cooling water 543 positioned within the first conduit 544. This heat exchange can cause portions of the gaseous treated byproduct 604 to liquefy—causing separating with the hot gases 603.

Warmed cooling water 543 is then removed and repositioned through an outlet 549 in the first conduit 544, which in turn feeds a second heat exchanger 547 positioned directly below the first heat exchanger 547. This removed warmed cooling water 543 then flows into the inlet 548 of the second heat exchanger to fill another first conduit 544. This process of removing, repositioning and re-feeding cooling water 543 can throughout as many heat exchanger 547 as necessary to effectuate appropriate separation.

Positioned within the second conduit 545 of each heat exchanger 547 is a third conduit 546. The third conduit 546 functions primarily to collect the various cooled and now liquefied treated byproduct 604. Positioned on the bottom of each third conduit 546 are perforations sufficient to collect liquid by product 604 cooled within the second conduit 545. Positioned at the distal end of the third conduit 546 is a connecting elbow 552. Positioned outside of both the first conduit 544 and second conduit 545, the connecting elbow 552 further effectuates liquefaction and condensing of the byproduct 604 (via air cooling) and then transports this liquid to the first liquid separator 560.

As further shown in FIG. 5, the distal end of each third conduit 546 contains a connecting elbow 552, which horizontally feeds into a centralized condensate drain 553. This condensate drain functions to house and maintain all of the liquid treated byproduct 604 from the various third conduits 546 of each heat exchanger 547. This resulting byproduct 604 can then be removed from the cogeneration system 500 through a disposal—which can be part of residential facilities 300 regular sewer or septic lines.

Likewise, cooled hot gases 603 which remain in the second conduit 544 are then transported to the next heat exchanger for additional cooling. This continued until the hot gases 603 reach near ambient temperature. This also helps ensure any treated byproduct 604 is properly separated for placement in the condensate drain 553. Any remaining hot gases 603 may be recycled back from the first cooling manifold 520 into the catalytic converter 530. Alternatively, these hot gases 603 may be additionally treated and cooled in a second cooling manifold 550.

Preferably, the liquid treated byproduct 604 is passed through the first liquid separator 560 shown in both FIG. 3 and FIG. 5. This liquid separator 560 includes a partial vacuum that can draw any additional undesirable light gases out of the treated byproduct 604. These gases 605 can either be retreated in the catalytic converter 540 via a recycle stream, or alternatively vented from the cogeneration system 500 to a passageway outside of the residential facility 300. Once these gases 605 are extracted through the partial vacuum, the remaining treated byproduct 604 can be drained through the residential facility's 300 septic or sewer system.

The Modified Engine

FIG. 6 offers a more detailed illustration of the salient components of the modified engine 520. As shown, an energy source 430 enters the modified engine 520 through the regulator system 504. The regulator system 504 ensures that correct flow rate and pressure of the energy source 430. An injector located within the engine block of the modified engine 520 places a sufficient amount of energy source 430—typically a fossil fuel—into each piston chamber. Each piston chamber includes a piston 521. Combustion of the injected energy source 420 helps move the piston 521 that in turn rotates a shaft 522. This turning shaft 522 helps rotate a magnetized coil within an alternator 523, which in turn creates electricity.

As is further shown in FIG. 6, the combustion of this injected energy source 420 also results in byproduct. This byproduct includes certain hot gases 603 identified above. These hot gases 630 are directed through a conduit out of the various piston chambers and into the catalytic converter 520 illustrated in FIG. 3.

An additional aspect of the modified engine 520 is ensuring proper harmonics and regulating the current to match the publicly available electricity grid 200. This includes the floating vibration mount 524—which ensures that the modified engine 520 does not shake in a manner that will lead to greater distortion in the outgoing current. This mount 524 can include use of soft materials such as rubber to help interact any shaking caused by combustion within the modified engine.

I claim:

1. A cogeneration system capable of generating electricity and usable heat, comprising:
    a modified combustion engine capable of powering an alternator to create electricity;
    a catalytic converter which receives hot gases produced by the modified combustion engine;
    one or more cooling manifolds having a plurality of heat exchangers to cool and filter the hot gases, each heat exchanger including a first conduit, a second conduit and a third conduit;
        the first conduit having an inlet and a corresponding outlet, wherein the inlet is connected to a supply line containing cooling water;
        the second conduit supplied with hot gases from the catalytic converter; and
        the third conduit capable of receiving a condensed treated byproduct to be drained from the cogeneration system; and
    a vent capable of removing the filtered hot gases.

2. The cogeneration system of claim 1, further comprising:
    a regulator system including one or more fuel valves and a fuel pump, the regulator system operable with the modified combustion engine.

3. The cogeneration system of claim 1, wherein:
    the catalytic converter includes a quantity of platinum and palladium.

4. The cogeneration system of claim 3, wherein:
    the hot gases are supplied from the modified engine to the catalytic converter at a temperature at least 800 degrees Fahrenheit and at least at 80 psi.

5. The cogeneration system of claim 1, further comprising:
    a first liquid separator capable of creating a partial vacuum to separate light gases from treated byproduct, the first liquid separator receiving treated by product from the third conduit located within the heat exchanger.

6. The cogeneration system of claim 5, further comprising:
    a second liquid separator capable of creating a partial vacuum to separate light gases from treated byproduct, the second liquid separator receiving treated by product from the third conduit located within the heat exchanger.

7. The cogeneration system of claim 1, wherein:
    the modified combustion engine is positioned on a floating vibration mount.

8. The cogeneration system of claim 1, further includes a control system comprising:
    a control panel including a regulator and a filter to regulate electricity generated by the modified combustion engine; and
    a battery attached to the control panel for storing electricity created by the cogeneration system, the battery including an automatic transfer switch, the automatic transfer switch capable of drawing electricity as needed by a breaker panel; and
    a meter which records the amount of electricity sold back to a central power authority operating the electricity grid.

* * * * *